United States Patent
Kaliski, Jr.

(10) Patent No.: US 7,716,484 B1
(45) Date of Patent: May 11, 2010

(54) SYSTEM AND METHOD FOR INCREASING THE SECURITY OF ENCRYPTED SECRETS AND AUTHENTICATION

(75) Inventor: Burton S. Kaliski, Jr., Wellesley, MA (US)

(73) Assignee: RSA Security Inc., Bedford, MA (US)

( * ) Notice: Subject to any disclaimer, the term of this patent is extended or adjusted under 35 U.S.C. 154(b) by 908 days.

(21) Appl. No.: 09/802,485

(22) Filed: Mar. 9, 2001

Related U.S. Application Data

(60) Provisional application No. 60/188,834, filed on Mar. 13, 2000, provisional application No. 60/188,458, filed on Mar. 10, 2000.

(51) Int. Cl.
*H04L 9/00* (2006.01)
(52) U.S. Cl. ..................................... 713/176
(58) Field of Classification Search ................... 380/44, 380/279, 259, 282, 286, 30, 277; 713/168, 713/171, 176
See application file for complete search history.

(56) References Cited

U.S. PATENT DOCUMENTS

| | | | | |
|---|---|---|---|---|
| 4,424,414 A | 1/1984 | Hellman et al. | ........... | 178/22.11 |
| 4,567,600 A | 1/1986 | Massey et al. | ............... | 375/2.1 |
| 4,720,860 A | 1/1988 | Weiss | ........................ | 380/23 |
| 4,759,063 A | 7/1988 | Chaum | ........................ | 380/30 |
| 4,885,778 A | 12/1989 | Weiss | ........................ | 380/48 |
| 4,947,430 A | 8/1990 | Chaum | ........................ | 380/25 |
| 5,023,908 A | 6/1991 | Weiss | ........................ | 380/23 |
| 5,168,520 A | 12/1992 | Weiss | ........................ | 380/23 |
| 5,222,140 A | 6/1993 | Beller et al. | .................... | 380/30 |
| 5,241,599 A | 8/1993 | Bellovin et al. | ................ | 380/21 |
| 5,367,572 A | 11/1994 | Weiss | ........................ | 380/23 |
| 5,440,635 A | 8/1995 | Bellovin et al. | ................ | 380/25 |
| 5,485,519 A | 1/1996 | Weiss | ........................ | 380/23 |
| 5,623,637 A * | 4/1997 | Jones et al. | ................... | 711/164 |
| 5,638,445 A * | 6/1997 | Spelman et al. | ................ | 705/77 |
| 5,922,074 A * | 7/1999 | Richard et al. | ............... | 713/200 |
| 6,240,184 B1 | 5/2001 | Huynh et al. | ................. | 380/206 |
| 6,505,164 B1 * | 1/2003 | Brunsting et al. | ............... | 705/1 |
| 6,829,356 B1 * | 12/2004 | Ford | ........................... | 380/44 |

OTHER PUBLICATIONS

Stalling, Cryptography and Network Security, Prentice Hall, 2nd Edition, pp. 143-144, 177-178, 312-313.*

(Continued)

*Primary Examiner*—Beemnet W Dada
(74) *Attorney, Agent, or Firm*—BainwoodHuang

(57) ABSTRACT

In general, in one aspect, the invention relates to a method for accessing encrypted data by a client. The method includes receiving from the client by a server client information derived from a first secret wherein the client information is derived such that the server can not feasibly determine the first secret. The method also includes providing to the client by the server intermediate data, which is derived responsive to the received client information, a server secret, and possibly other information. The intermediate data is derived such that the client cannot feasibly determine the server secret. The method also includes authenticating the client by a device that stores encrypted secrets and is configured not to provide the encrypted secrets without authentication. After the authenticating step, the method also includes providing the encrypted secrets to the client. The encrypted secrets 5 are capable of being decrypted using a third secret that is derived from the intermediate data.

35 Claims, 7 Drawing Sheets

OTHER PUBLICATIONS

Schneier, Applied Crytography, John Wiley, 2nd Edition, p. 61.*

Shamir, How to Share a Secret, 1979, ACM, vol. 22, pp. 612-613.*

Elgamal, A Public Key Cryptosystem and a Signature Scheme Based on Discrete Logarithms, IEEE, vol. IT-31, pp. 469-472.*

Bellovin and Merritt, "*Encrypted Key Exchange: Password-Based Protocols Secure Against Dictionary Attacks*", (pp. 72-84); Proceedings of the IEEE Symposium on Research in Security and Privacy, May 1992.

Bellovin and Merritt, "*Augmented Encrypted Key Exchange: a Password-Based Protocol Secure Against Dictionary Attacks and Password File Compromise*", (pp. 1-7); AT&T Bell Laboratories Technical Report, 1994.

Boneh, DeMillo, and Lipton, "*On the Importance of Checking Cryptographic Protocols for Faults*" (*extended abstract*), (pp. 1-14); [online], [retrieved Jul. 26, 2001], retrieved from the Internet URL:http://citeseer.nj.nec.com/boneh97importance.html.

Boneh and Franklin, "*Efficient Generation of Shared RSA Keys*", (pp. 1-21); [online], [retrieved Jul. 26, 2001], retrieved from the Internet URL:http//citeseer.nj.nex.com/358268.html.

Cannetti and Gennaro, "*Proactive Security: Long-Term Protection Against Break-Ins*", (pp. 1-8); RSA Laboratories, CryptoBytes, vol. 3, No. 1, Spring 1997.

Chaum, "*Security Without Identification: Transaction Systems to Make Big Brother Obsolete*," (pp. 1030-1044); Communications of the ACM, Oct. 1985, vol. 28 No. 10.

Chaum, "*Blind Signatures for Untraceable Payments*", (pp. 199-203); Advances in Cryptology, Proceedings of the Crypto '82, Workshop on the Theory and Application of Cryptographic Techniques, Santa Barbara, California, Aug. 23-25, 1982, New York 1983.

Coron, Naccache, and Stern, "*On the Security of RSA Padding*", (pp. 1-18); Advances in Cryptology, Proceedings of the Crypto '99, Springer 1999.

Desmedt and Odlyzko, "*A Chosen Text Attack on the RSA Cryptosystem and Some Discrete Logarithm Schemes*", (pp. 516-522); Advances in Cryptology, Proceedings of Crypto '85, Springer-Verlag 1986.

Dierks and Allen, "*The TLS Protocol Version 1.0*", (pp. 1-75); IETF RFC 2246, Jan. 1999, [online], [retrieved Jul. 25, 2001], retrieved from the Internet URL:http://www.jetf.org/rfc/rfc2246.txt.

Frier, Karlton, and Kocher, "*The SSL 3.0 Protocol*", (pp. 1-62); Netscape Communications Corp., Nov. 18, 1996, [online], [retrieved Jul. 10, 2001], retrieved from the Internet URL:http://home.netscape.come/eng/ssl13/draft302.txt.

Gong, "*Increasing Availability and Security of an Authentication Service*," (pp. 657-662); IEEE Journal on Selected Areas in Communications, vol. 11, No. 5, Jun. 1993.

Gong, Lomas, Needham, and Saltzer, "*Protecting Poorly Chosen Secrets From Guessing Attacks*," (pp. 648-656); IEEE Journal on Selected Areas in Communications, vol. 11, No. 5, Jun. 1993.

Gong, "*Optimal Authentication Protocols Resistant to Password Guessing Attacks*", (pp. 24-29); Proceedings of the $8^{th}$ IEEE Computer Security Foundations Workshop, Ireland, Jun. 13-15, 1995.

Halevi and Krawczyk, "*Public-Key Cryptography and Password Protocols*", (pp. 122-131); Proceedings of the Fifth ACM Conference on Computer and Communications Security, Nov. 3-5, 1998.

Heroux, "*A Private Key Storage Server for DCE—Functional Specification*", (pp. 1-73); Open Software Foundation, Request for Comments: 94.1, Nov. 1996, [online], [retrieved on Jul. 17, 2001], retrieved form the Internet URL:http://www.opengroup.org/rfc/mirror-rfc/rfc94.1.txt.

Herzberg, Jarecki, Krawczyk, and Yung, "*Proactive Secret Sharing Or: How to Cope With Perpetual Leakage*", (pp. 339-352); Advances in Cryptology, Proceedings of the Crypto '95, California, Aug. 1995, Springer 1995.

Jablon, "*Strong Password-Only Authenticated Key Exchange*", (pp. 1-24); ACM Computer Communications Review, Sep. 25, 1996.

Jablon, "*Extended Password Key Exchange Protocols Immune to Dictionary Attack*", (pp. 248-255); Proceedings of the WETICE '97 Enterprise Security Workshop, Jun. 1997.

Juels, Luby, and Ostrovsky, "*Security of Blind Digital Signatures*", (pp. 150-164); Advances in Cryptology, Proceedings of the Crypto '97, California, Aug. 1997, Springer 1997.

Kohl and Neuman, "*The Kerberos Network Authentication Service*", (pp. 1-105); RFC 1510, Internet Activities Board, Sep. 1993, [online], [retrieved Jul. 10, 2001], retrieved from the Internet URL:http://www.ieff.org/rfc/rfc1510.txt.

Law, Menezes, Qu, Solinas, and Vanstone, "*An Efficient Protocol for Authenticated Key Agreement*", (pp. 1-16); Technical Report CORR 98-05, Dept. of C&O, University of Waterloo, Canada, Mar. 1998 (revised Aug. 28, 1998).

Lim and Lee, "*A Key Recovery Attack on Some Discrete Log-Based Schemes Using a Prime-Order Subgroup*", (pp. 249-263); Advances in Cryptology, Proceeding of the Crypto '97, vol. 1294 of Lecture Notes in Computer Science, Springer 1997.

Menezes, van Oorschot, and Vanstone, "*Handbook of Applied Cryptography*", from Chapter 12 *Key Establishment Protocols*, Section 12.22 Protocol *Shamir's no-key protocol*, (p. 500); CRC Press 1997.

M'Raihi, "*Cost-Effective Payment Schemes With Privacy Regulation*", (pp. 266-275); Advances in Cryptology, Proceedings of ASIACRYPT '96, vol. 1163 of LNCS, 1996.

MacKenzie and Swaminathan, "*Secure Network Authentication With Password Identification*", (pp. 1-11); Submission to IEEE P1363 a working group, Jul. 30, 1999, [online], [retrieved Jul. 10, 2001], retrieved form the Internet URL:http://www.manta.ieee.org/groups/;1363/studygroup/passwd.html.

Monrose, Reiter, and Wetzel, "*Password Hardening Based on Keystroke Dynamics*", (pp. 73-82); Proceedins of the $6^{th}$ ACM Conference on Computer and Communications Security, Nov. 1-4, 1999, Singapore, [online], [retrieved on Sep. 6, 2000], retrieved from the Internet URL:http://www.acm.org/pubs/contents/proceedings/commsec/319709.

Perlman and Kaufman, "*Secure Password-Based Protocol for Downloading a Private Key*", Proceedings of the 1999 Network and Distributed System Security Symposium, Internet Society, Jan. 1999.

Pohlig and Hellman, "*An Improved Algorithm For Computing Logarithms Over GF(p) and Its Cryptographic Significance*", (pp. 106-110); IEEE Transctions on Information Theory, vol. 24, No. 1, Jan. 1978.

Pointcheval and Stern, "*Provably Secure Blind Signature Schemes*", (pp. 252-265); Advances in Cryptology, Proceedings of the ASIACRYPT '96, Kyongju, Korea, Nov. 1996, Springer 1996.

Rivest, Shamir, and Adleman, "*A Method for Obtaining Digital Signatures and Public-Key Cryptosystems*," (pp. 120-126); Communications of the ACM, vol. 21, No. 2, Feb. 1978.

"Skipjack and Kea Specifications", (pp. 1-23); NIST, May 29, 1998, [online], [retrieved Jul. 10, 2001], retrieved from the Internet, URL:http://csrc,nist.gov/encryption/skipjack-kea.htm.

Stadler, Piveteau, and Garnenisch, "*Fair Blind Signatures*", (pp. 209-219); Advances in Cryptology, Proceedings of the Eurocrypt '95, International Conference on the Theory and Application of Cryptographic Techniques, Saint-Malo, France, May 21-25, 1995, Springer 1995.

von Solms and Naccache, "*On Blind Signatures and Perfect Crimes*", (pp. 581-583); Computers and Security, vol. 11, No. 6, 1992.

Wu, "*The Secure Remote Password Protocol*", (pp. 1-15); Proceedings of the 1998 Network and Distributed System Security Symposium, Internet Society, Jan. 1998.

Zuccherato, "*Methods for Avoiding the 'Small Subgroup' Attacks on the Diffie- Hellman Key Agreement for S/MIME*", (pp. 1-11); IETF Internet-Draft (work in progress), Jun. 1999, [online], [retrieved Aug. 29, 2009], retrieved from the Internet URL:http://www.ietf.org/proceedings/99;ul/1-D/draft-ieft-smime-small-subgroup-ol.txt.

Yao, Andrew. *Protocols for Secure Computations*, pp. 160-164, Berkley, California, IEEE 1982.

Schneier, Bruce. *Applied Cryptography: Protocols, Algorithms, and Source Code in C.*, pp. 383-387, 600, New York: John Wiley & Sons, Inc, 1994.

* cited by examiner

SYSTEM AND METHOD FOR INCREASING THE SECURITY OF ENCRYPTED SECRETS AND AUTHENTICATION

CROSS-REFERENCE TO RELATED APPLICATIONS

This application claims the benefit of U.S. Provisional Application Ser. No. 60/188,458, "Server-Assisted Regeneration of a Strong Secret from a Password," by Warwick Ford and Burt Kaliski, filed Mar. 10, 2000. U.S. Provisional Application Ser. No. 60/188,834, filed Mar. 13, 2000 "Server-Assisted Regeneration of a Strong Secret from a Weak Secret," is incorporated herein by reference.

TECHNICAL FIELD

This invention relates generally to the field of cryptographic protocols and, more particularly, to a system and method for increasing the security of secrets used to decrypt encrypted secrets and secrets used to authenticate users to a server.

BACKGROUND

FIG. 1 shows a prior art system 100 in which a user 3 stores secrets 5 on a remote server computer 10, where the term secrets is used broadly to mean any data or information that the owner wishes to keep private. The user 3 accesses the secrets 5 using a client computer 15 that is connected to the server computer 10 via a data or telecommunications network 20, such as the Internet. Storage of the secrets 5 on the server 10 allows the user 3 to access the secrets 5 from any client computer connected to the network 20.

To help prevent the secrets 5 from being obtained by others, the secrets 5 are typically encrypted. Encrypting the secrets 5, for example, by use of a key 24, prevents someone who has access to the secrets 5 from learning the secrets 5, for example, by compromise of the server or by observing the user's communications with the server 10 over the network 20. The encryption of the secrets 5 can be performed according to various known techniques including symmetric encryption in which the same decryption key 24 is used for both encryption and decryption, and/or asymmetric encryption, in which different keys are used for encryption and decryption respectively.

As the number of possible values from which a key 24 might be chosen (the "key space") is increased by changing the encryption implementation, it becomes increasingly more difficult for an attacker to try every possible decryption key 24. At some point, the number of possible of keys is so great that an encrypted secret 5 cannot feasibly be decrypted by trying each possible key 24. This is referred to as a strong encryption, because the large key space makes the encryption stronger. For example, a key that is chosen from the set of all known English words is much weaker than a key that is chosen from the set of all 1024-bit numbers. An encryption and/or decryption key 24 that is selected from a large key space is typically cumbersome for a user 3 to employ, however, because long sequences of characters are difficult for humans to remember. Users 3 may be inclined to write down such sequences, thereby making the key available to an attacker. To ease the memory burden on users 3, shorter decryption keys 24 are frequently used, with the disadvantage that it may be feasible for a party that has access to the encrypted secrets 5 to decrypt the encrypted secrets 5 by trying every possible key.

SUMMARY

There exists a need, therefore, for a convenient and secure means for a user to access data that has been encrypted using strong secrets, and also to authenticate to servers using strong secrets.

In general, in one aspect, the invention relates to a method for accessing encrypted data by a client. The method includes receiving from the client by a server client information derived from a first secret wherein the client information is derived such that the server can not feasibly determine the first secret. The method also includes providing to the client by the server intermediate data that is derived responsive to the received client information, a server secret, and possibly other information. The intermediate data is derived such that the client cannot feasibly determine the server secret. The method also includes authenticating the client by a device that stores encrypted secrets and is configured not to provide the encrypted secrets without authentication. The method also includes, after the authenticating step, the step of providing the encrypted secrets to the client. The encrypted secrets are capable of being decrypted using a third secret that is derived from the intermediate data.

In one embodiment, the third secret is derived from the intermediate data by use of a key derivation function. In one embodiment, the third secret is the intermediate data. In one embodiment, the first secret includes one or more of a PIN, a password, and biometric information.

In another embodiment, the intermediate data is derived from at least the first secret and the server secret by the use of a blind function evaluation protocol. In one variation of this embodiment, the blind function evaluation protocol involves the use of the RSA cryptosystem. In another variation of this embodiment, the security of the blind function evaluation protocol is based on the principles of discrete logarithms. In another embodiment, the blind function evaluation protocol involves the use of a one-way function that is calculated using a multiparty secure computation technique.

In various embodiments, the authenticating step can include authenticating the client based on one or more of a PIN, a password, a token code, a time-dependent code, and biometric information, alone or in combination. In one embodiment, the authenticating step includes authenticating the client based on a secret other than the first secret. In another embodiment, the authenticating step includes using a secret derived from the intermediate data.

In another embodiment, the device includes at least one of a file server, a directory server, a key server, a PDA, a mobile telephone, a smart card, and a desktop computer. In one such embodiment, the device includes at least one secure data store, which requires authentication before allowing the client access to the data store.

In another embodiment, the encrypted secrets include a private key of a public/private key pair used for asymmetric cryptography. In one such embodiment, the private key is a signature key used for creating a digital signature. In one such embodiment, the authenticating step involves authenticating the client based on a secret other than the first secret, so that the user provides different information to access the device and to access the signature key. In such an embodiment, the user authenticates to a computer using one authentication mechanism, and uses a password different than the authentication mechanism to digitally sign a document. The password is used in a blind function evaluation protocol, the result of which is used to decrypt the signature key. This procedure can be used to satisfy digital signature requirements that a different password be used to digitally sign a document.

In still another embodiment, the encrypted secrets include a secret key used for symmetric cryptography. In another additional embodiment, the encrypted secrets include at least one unit of digital currency. In one such embodiment, the encrypted secrets function as an electronic wallet, containing digital currency and/or other information, such as keys and identification numbers. In still another embodiment, the encrypted secrets include one or more usernames and passwords that can be used to authenticate to one or more other servers. In this way the user can remotely access the collection of access codes, and use them to access other servers.

In another embodiment, the method also includes the step of verifying that the client has not exceeded a predetermined number of unsuccessful attempts to obtain the intermediate data. In one variation of this embodiment, the verifying step also includes the steps of transmitting a challenge code to the client and receiving the result of a cryptographic operation using the challenge code as an input and using a cryptographic key derived from at least one of the encrypted secrets. In another embodiment, the verification comprises showing knowledge of some item of information contained in the encrypted secrets.

In general, in another aspect, the invention relates to a system for accessing encrypted data by a client. The system includes a first server. The first server includes a first server receiver for receiving from a client client information derived from a first secret. The client information is derived such that the first server can not feasibly determine the first secret. The system includes a server secret. The system includes a first server output for providing to the client by the server intermediate data. The intermediate data is derived from at least the received client information and a server secret. The intermediate data is derived such that the client can not feasibly determine the server secret. The system also includes a second device. The second device includes a data store storing an encrypted secret. The encrypted secret is capable of being decrypted using a third secret that is derived from the intermediate data. The device includes an authentication subsystem for authenticating the client by the device. The device includes a device output for providing to the client by the device the encrypted secrets upon authentication.

In one embodiment, the third secret is derived from the intermediate data by use of a key derivation function. In another embodiment, the intermediate data is derived from at least the first secret and the server secret by use of a blind function evaluation protocol. In another embodiment, the intermediate data is derived from at least the first secret and the server secret and the security of the blind function evaluation protocol is based on the principles of the RSA cryptosystem, the problem of extracting roots modulo a composite. In another embodiment, the intermediate data is derived from at least the first secret and the server secret and the security of the blind function evaluation protocol is based on the principles of discrete logarithms.

In one embodiment, the authentication subsystem authenticates the client based on a secret other than the first secret. In one embodiment, the authentication subsystem authenticates the client using a secret derived from the intermediate data. In one embodiment, the second device comprises at least one of a file server, a directory server, a key server, a PDA, a mobile telephone, a smart card, and a desktop computer. In one embodiment, the encrypted secret is one of a private key of a public/private key pair used for asymmetric cryptography, a signature key used for creating a digital signature, a secret key used for symmetric cryptography, and at least one unit of digital currency. In one embodiment, the first server also includes a verifier for verifying that the client has not exceeded a predetermined number of unsuccessful attempts to obtain the intermediate data.

In general, in another aspect, the invention relates to a method for generating a password for a user to use for authenticating to a server. The method includes specifying a server secret, and receiving from a client a server identifier and client information derived from a first secret wherein the client information is derived such that the first server can not feasibly determine the first secret. The method includes generating a password derived from at least the server identifier, the client information, and the server secret wherein the password is derived such that the client can not feasibly determine the server secret from knowledge of the first secret, the web server identifier, and the generated password.

In one embodiment, the method also includes transmitting the generated password to the client. In another embodiment, the method also includes transmitting an attempt identifier to the client with the generated password. In another embodiment, the method also includes receiving from the server verification that the user has authenticated successfully to the server.

In general, in another aspect, the invention relates to a password for a user to use for accessing a web server. The system includes a server secret and a receiver for receiving from a client a web server identifier and client information derived from a first secret wherein the client information is derived such that the first server can not feasibly determine the first secret. The system also includes a password generator for generating a password derived from at least the web server identifier, the client information, and the server secret wherein the password is derived such that the client can not feasibly determine the server secret from knowledge of the first secret, the web server identifier, and the generated password.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
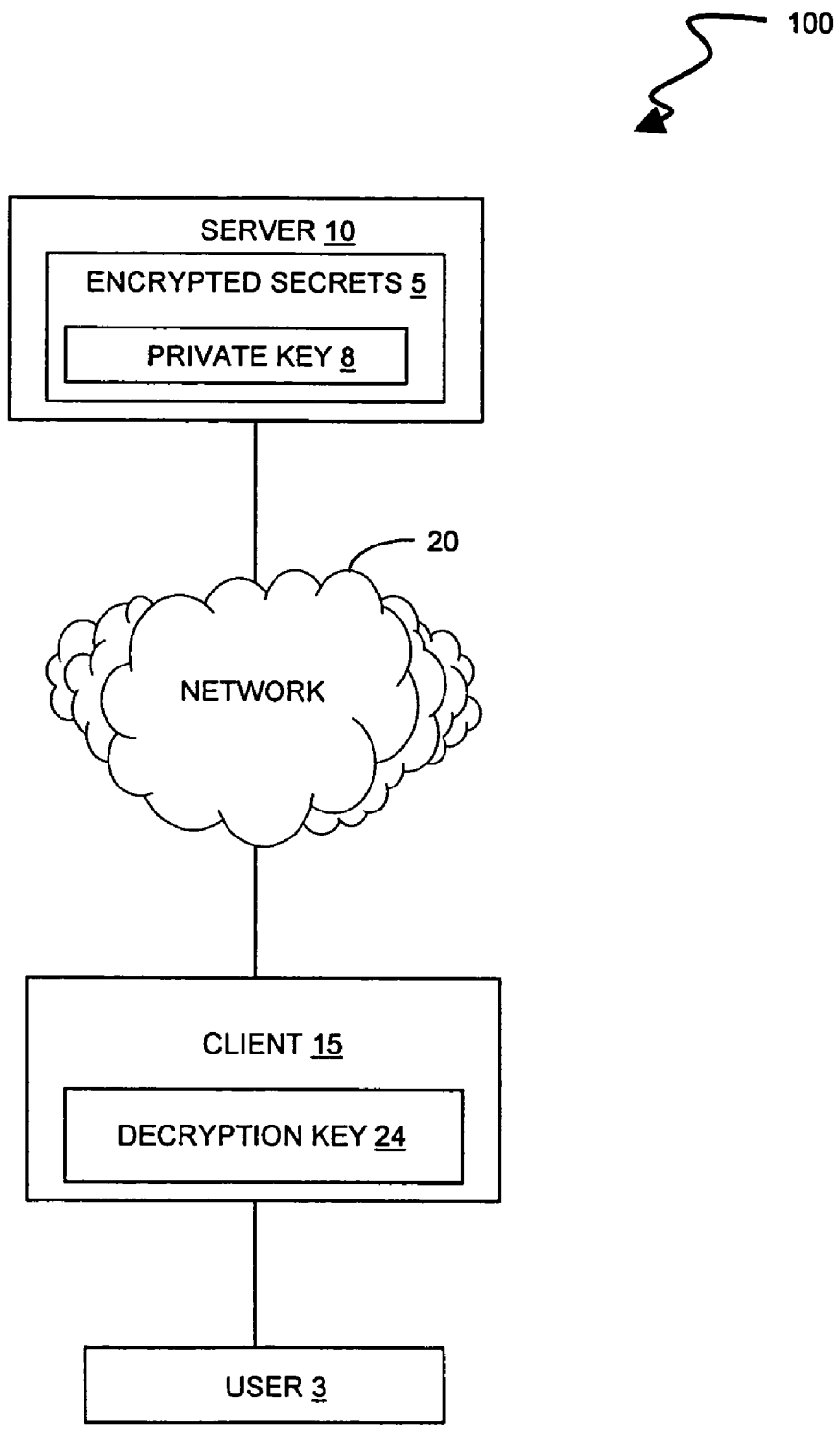
FIG. 1 is block diagram of a prior art system 100 for accessing encrypted secrets.
Figure 2:
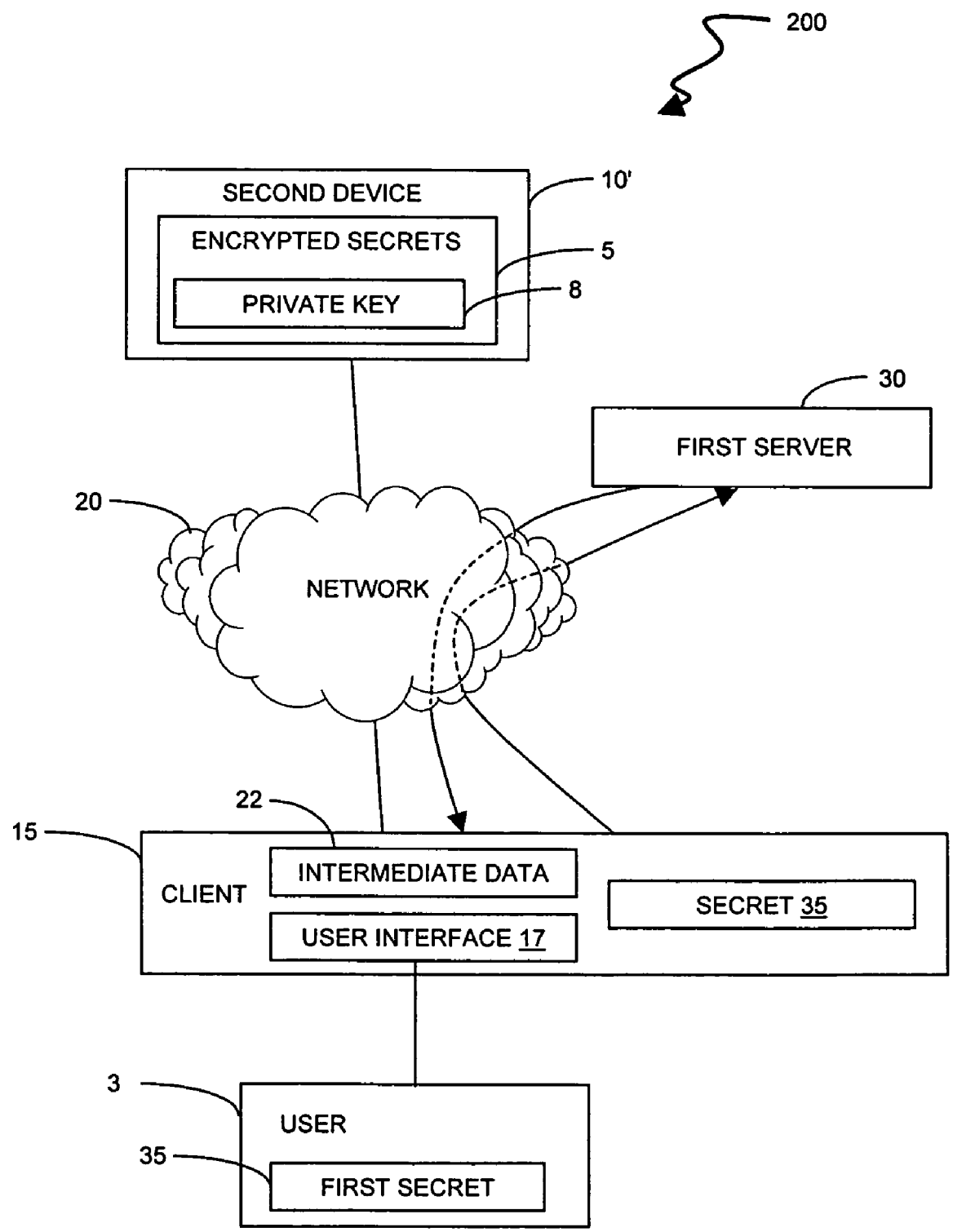
FIG. 2 is block diagram of a system 200 according to an embodiment of the invention for accessing encrypted secrets.

Referring to FIG. 2, an embodiment of a system 200 according to the invention allows a user 3 to conveniently and securely gain access to encrypted secrets 5, where the term secrets is used broadly to mean any data or information that the owner wishes to keep private. Here, for convenience, the encrypted secrets 5 are referred to in the plural, although there may be one or more secrets. The one or more secrets may include any data or information, as examples without limitation, such secrets as a private key 8 of a public/private key pair as used in asymmetric cryptography and/or for providing a digital signature, a secret key used for symmetric cryptography, one or more units of digital currency, or some combination. In this embodiment of the invention, the security of the encrypted secrets 5 is increased by storing the encrypted secrets 5 in one device that requires authentication for access to the secrets (the second device 10') and storing information used in the decryption process in another device (the first server 30).

The system 200 includes a client 15 that may interact with a user 3. The client can be implemented as any sort of device or machine capable of communicating with the second device 10' and the first server 30. As examples of implementations of clients 15 not intended to be limiting, the client 15 may be one or more of a personal computer, a mobile telephone, a personal digital assistant (PDA), a network appliance, a smart card, a network terminal, and a workstation.

The client 15 is in communication with a first server 30 and a second device 10' over communications links, which may be the same, or different communications links for each of the first server 30 and the second device 10'. For example, the client 15 may be a PDA that communicates via a wireless and wired internet protocol network with the first server 30, and via a direct serial connection to the second device 10'. As another example, the client 15 may be a personal computer in an airport that communicates with both the first server 30 and the second device 10' over a wired internet protocol network such as the Internet. Again, these examples of types of communications links are not intended to be limiting, and the invention may be used with any suitable wireless or wired communication links.

In an embodiment of the invention, a user 3 provides a first secret 35 to the client 15. The first secret 35 can be something that is measured or something that the user enters, for example through a user interface 17. Typically, the first secret 35 might be (as examples not intended to be limiting) one or more of a short numerical code such as a PIN, an alphanumeric code such as a password, a token code, a time-based code such as that provided by a RSA SECURID security token manufactured by RSA Security Inc. of Bedford, Mass., biometric information, and data derived from one or more of these.

The client derives client information 38 from the first secret 35 that is used to harden (i.e., strengthen) the first secret 35. The derivation might be that the client 15 uses the first secret 35 directly as the client information 38. The derivation might be that the client uses the first secret 35 as part of a blind function evaluation protocol to generate the client information 38. The derivation can include use of one or more of a key derivation function, mask generation function, or another cryptographic function to derive the client information 38 from the first secret 35. As described further below, the derivation may be for using the first secret 35 as part of a blind function evaluation protocol.

The first server 30 receives the client information 38 from the client. Preferably, the client information 38 is such that the first server 30 can not feasibly determine the first secret from the client information 38, with feasibly being used here to mean not without an extraordinary amount of time and/or computational effort. In response to the client information 38, the first server 30 provides the client 15 with intermediate data 22, which is used by the client 15 (directly or indirectly) to decrypt the encrypted secrets 5.

The first server 30 may derive the intermediate data 22 from a combination of information 38 that the client 15 provides to the first server 30 and a server secret, that is stored on or available to the first server 30. The intermediate data 22 is preferably derived such that the client can not feasibly determine the server secret, meaning that an attacker posing as the client 15, or observing the client's interactions with the first server 30 can not determine the server secret without an extraordinary amount of time and/or computational effort.

The first server 30 preferably is a server-class computer that is in communication with a network 20, and that is capable of responding to many requests from clients 15 throughout the network 20. In other embodiments, the first server 30 may be any type of computer or device. The first server may be, as examples not intended to be limiting, a personal computer, a mobile telephone, a personal digital assistant (PDA), a network appliance, a smart card, a network terminal, or a workstation.

The client 15 and the first server 30 interact such that the client 15 is provided with intermediate data 22 that the client 15 can use as part of the process to decrypt the encrypted secrets 5. The client 15 may use the intermediate data 22 directly as a decryption key, for example, if the decryption key is communicated over a secure channel. Alternatively, the client 15 may derive (possibly in combination with other information) from the intermediate data 22 some portion or all of one or more decryption keys that are used to decrypt the encrypted secrets 5. The client 15 and the first server 30 may participate in a blind function evaluation protocol, in which the client 15 has some secret information and the first server 30 has some secret information, and together the client 15 and the first server 30 provide their respective secrets as an input to a jointly calculated function, without either the client 15 or the first server 30 revealing their secrets to the other and with only the client 15 obtaining the output of the jointly calculated function. The specifics of the particular blind function evaluation protocol, what the first server 30 does with the client information 38, and what the client 15 does with the intermediate data 22, will vary depending upon the evaluated function and the blinded protocol selected.

The interaction between the client 15 and the first server 30 might include only a single data exchange or they might participate in more complicated protocols in which multiple data exchanges take place. For example, in a simple blind function evaluation protocol, there might be a single communication of client information 38 to the first server 30, and a single response of the first server 30 back to the client 15 in which the intermediate data 22 is communicated. In more complex blind function evaluation protocols, portions of client information 38 are sent at different times to the first server 30, and portions of intermediate data 22 are communicated to the client 15 at different times.

The use of a blind function evaluation protocol, or other embodiments in which the decryption key is derived from the client information, provides additional security benefits resulting from the fact that the first server 30 does not have the decryption key in an unblinded form. Even if the first server 30 is compromised, and a server secret obtained, it will still be necessary for an attacker to do more work to transform the server secret into the decryption key. Just as one example, in one such embodiment, the first server 30 and client 15 engage in a blind function evaluation protocol that results in the first server 30 providing to the client 15 a blinded key as the intermediate data 22. The client 15 has information used to unblind the decryption key 24, which is then used to decrypt the encrypted secrets 5. Compromise of the first server 30 would still not directly reveal the decryption key 25 to an attacker.

In one embodiment, a verification is used to prevent attempts to gain access to the intermediate data 22 by repeated guessing of the first secret 35 or client information 38. Without such a verification, an attacker that compromises the second device 10' and has access to the encrypted secrets 5 could determine the corresponding intermediate data 22 by sending the various possible values of the client information 38 to the first server 30. By limiting the number of unsuccessful attempts allowed, the first server 30 prevents such an attack. For example, the verification can be made by demonstrating successful decryption of the encrypted secrets 5. If the encrypted secrets 5 include an encryption key, the encryption key can be used to encrypt a challenge value provided by the first server 30. If the encrypted secrets 5 include personal information of the user, such information can be provided to the first server 30.

In one embodiment, biometric information is used for the first secret 35, through the use of "fuzzy commitment" techniques such as those described in PCT Patent Application Serial No. PCT/US00/03522 entitled "A Fuzzy Commitment Scheme." The transformation from initial biometric information to first secret 35 is accomplished with the use of codes that are akin to error correcting codes. Generally, the resulting first secret 35 has at least PIN-level security due to the limited amount of uncertainty available in typical biometrics and the accommodation for measurement errors. In one embodiment, code information used to correct differences in biometric information is stored on a code server (not shown) connected to the network 20. The client 15 combines the code information with biometric data to generate the first secret 35. In other embodiments, the code information is stored on the client 15, the first server 30, the second device 10', or some combination.

The second device 10' stores encrypted secrets 5 for the user 3. The second device 10' can be implemented as any sort of device or machine capable of storing encrypted secrets and communicating the secrets upon authentication. As examples of implementations of devices 10' not intended to be limiting, the second device 10' can be one or more of a file server, a directory server, a key server, a personal computer, a mobile telephone, a personal digital assistant (PDA), a network appliance, a smart card, a network terminal, and a workstation. In one embodiment, the second device 10' is implemented in the client 15 in a cryptographically secure section of memory or on a dedicated cryptographically secure chip. The encrypted secrets 5 are stored in the second device 10' such that a client 15 authenticates to the second device 10' prior to the second device 10' providing the encrypted secrets 5 to the client 15. The second device 10' may be an already-existing file server or other authenticated data store. The system and method of the invention can be used to provide additional security to secrets stored on such a data store.

In one embodiment, the second device 10' does not provide encrypted secrets 5 to the client 15 until the client 15 has authenticated to the second device 10'. The authentication step can be based on information derived from the intermediate data 22 or the authentication can be based on independent authentication information, such as a PIN, a password, a token code, a time-based code, biometric information, or some combination. The second device 10' can be an already-existing, or standard, authenticating data store, for example, a directory server such as a file server accessed by MICROSOFT WINDOWS NT available from Microsoft Corporation of Redmond, Wash., clients, or a file system accessed by NIS clients, such as those available from Sun Microsystems of Mountain View, Calif. The second device 10' can also be a local device (implemented in hardware or software) on the user's 3 personal computer, or a portable memory device in communication with the client 15 by PCM-CIA or serial connection. Because the encrypted secrets 5 can be stored in a conventional manner, the system of the current invention can be integrated with existing systems that provide authenticated access to encrypted secrets 5 to increase the security of the encryption.

In one example embodiment that enables digital signing of documents, a user has one mechanism for authenticating to a computer, and another for signing a document. In this embodiment, a computer stores an encrypted signature key and the user authenticates to that computer to obtain the encrypted signature key. When the user wishes to use the encrypted signature key to sign a document, the user provides a client (which may be the computer) with a password. The client engages in a blind function evaluation protocol with a first server. The result of the blind function evaluation protocol (or a key derived from the result) is used to decrypt the signature key, and the signature key is then used to digitally sign a document. In this way, a second mechanism, involving an independent server, is used to enable the digital signature of a document. Compromise of the computer does not enable an attacker to make use of the signature key.

Figure 3:
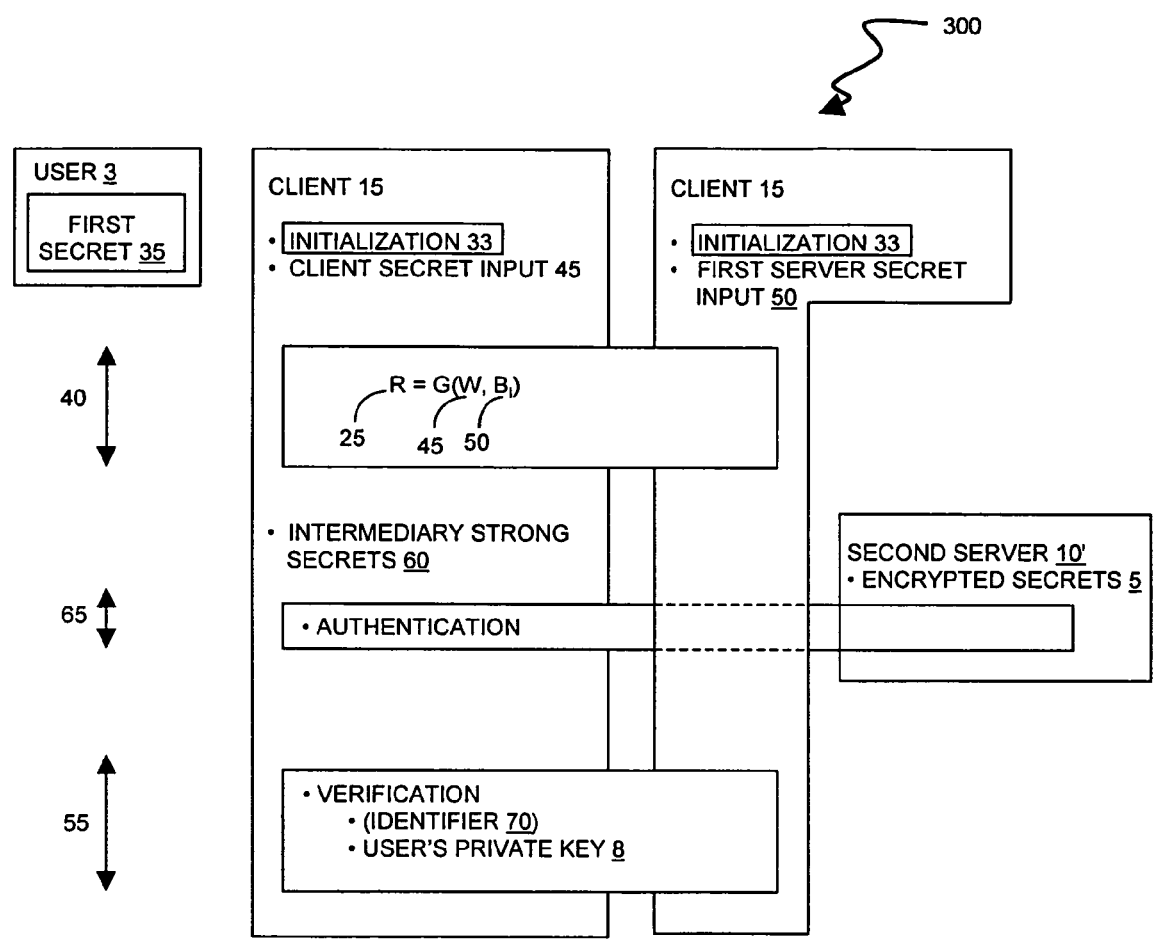
FIG. 3 is block diagram of an embodiment of the system 200 that makes use of a blind function evaluation protocol.

Referring to FIG. 3, in one embodiment, a client 15 communicates with a first server 30 and a second device 10" as in FIG. 2. In this illustrative embodiment, the second device 10" is a second server that is accessed over a communications network such as the Internet. In this illustrative embodiment, the communication between the client 15 and the first server 30 takes place over a computer network 20 such as the Internet, and the communication between the client 15 and the second server 10" takes place over a computer network such as the Internet. Prior to the user 3 attempting to access the encrypted secrets 5, the system 300 is initialized 33 for use by the user 3. This initialization may include operations performed on both the client 15 and first server 30 and some initial exchange of data.

To access the encrypted secrets 5, the user 3 first uses the client 15 and the first server 30 to convert a first secret 35 into a decryption key 25, which preferably is a stronger key than the first secret 35. In this example, the first secret 35 is a password, that is a sequence of symbols that can be conveniently remembered by the user 3. As described above, in other embodiments, the first secret 35 might also be something else, or a combination of a password and something else.

In this embodiment, the client 15 participates in a blind function evaluation protocol 40 with the first server 30. The blind function evaluation protocol 40 takes as input client information in the form of the client's secret input 45, which may be the first secret 35 or information derived by the client 15 from the first secret 35, and a server secret 50 to produce a hardened (i.e. stronger) secret 25 than the first secret 35. The hardened secret is stronger at least partially because it is chosen from a much larger key space and so it is more difficult to guess. The blind function evaluation protocol is designed in such a way that the first secret 35 and the hardened secret 25 result are known to the client 15 but not the first server, and the first server secret 50 is known only to the first server 30, yet both the client 15 and the server 30 participate in the protocol.

A blind function evaluation protocol 40 can be represented mathematically by the expression $R = g(w, b)$ where, R is the result 25 of the blind function evaluation protocol, b is the first server's secret 50, and w is the client's 15 secret input 45. The function g is constructed such that the client 15 cannot determine the first server's secret 50 given the result 25, yet the same inputs 45, 50 consistently produce the same output 25 R. Preferably, the protocol is also designed such that a third party does not learn any of the three values b, w, and R.

Various blind function evaluation protocols have been developed that are based on different functions. These include, as examples not intended to be limiting, implementations based on discrete-logarithm cryptography and the RSA algorithm which is based on the problem of extracting roots modulo a composite. Blind function evaluation is an instance of multi-party secure computation, introduced by A. Yao in "Protocols for Secure Computations," IEEE FOCS (1982), pp. 160-164. In multi-party secure computation, a function is computed in which the inputs are provided by two or more parties, and the output may be kept private from some parties as well. It has been shown that any polynomial-time-computable function g can be computed securely in polynomial time by representing the function as a logic circuit and evaluating it with what amounts to a gate-by-gate protocol (which tends to be complex).

In the embodiments described below, using discrete logarithm cryptography and the RSA cryptosystem, the function g has a special form and the protocol is more efficient, but it is also possible to use another one-way function, for example a hash function, or an encryption function, and apply the general methods. Generally, the function g(w, b) should be one-way with respect to b such that it is difficult to determine b, given a set of g(w, b) values for some inputs w. Otherwise, an attacker could participate in the protocol some number of times, each time providing different values of w, and then solve for b. Also, it should be difficult, given a set of g(w, b) values for some inputs w, to determine g(w, b) for other values of w. Otherwise, an attacker could use the results of some password guesses to get other password guesses. The second property implies the first.

Yao's construction enables two parties, such as the server and the client in this implementation, to compute the output y of any polynomial-computable function g on any pair of secret inputs b and w in the domain of g in such a way that the evaluator learns y, and neither party learns any additional information. Other variants are also possible.

We assume that the server behaves correctly, i.e., adheres to the protocol, but may try to learn additional information. In this case, the Yao construction involves two phases. In the first phase, the server decides on a polynomial-sized boolean circuit C. Input to this circuit is a secret v, while the output is g(v, b). (The input b is built into the circuit.) Let $v_1, v_2, \ldots, v_n$ represent the individual bits of v. The circuit C is constructed in such a way that each bit $v_i$ is expressed as one of two random "tags", $y_i^0$ and $y_i^1$, the first assigning a '0' bit to $v_i$ and the second assigning a '1' bit to $v_i$. The server sends C (in an appropriate representation) to the user. Further details are available in the Yao paper.

In order to evaluate C on the desired secret value $w=w_1, w_2 \ldots w_n$, the user must obtain the correct set of tags $\{y^{wi}\}$. On the other hand, to ensure in general that the user learns no information other than y, it is critical that the user learn only these tags, and furthermore that the server not learn which tags the user has obtained. This is accomplished by means of a protocol known as one-out-of-two oblivious transfer, abbreviated 1-2 OT. 1-2 OT is a cryptographic primitive involving two players, a sender and a receiver. The sender sends two values $x_0$ and $x_1$ to the receiver. The receiver selects a bit c and receives $x_c$. The sender learns no information about c, while the receiver learns no information about $x_{1-c}$. Yao proposed an RSA cryptosystem based 1-2 OT protocol in the paper referenced above, while Goldreich, Micali, and Wigderson extended the protocol to make use of any one-way permutation.

In the second phase, the server sends the set of tags $y_i^{w_i}$ to the user using a 1-2 OT protocol as follows. For each value i, the server sets $x_0=y_i^0$ and $x_1=y_i^1$ and the user selects $z=w_i$. Once the second phase is complete, the user has all of the necessary tags to compute g(w, b).

In one embodiment, the client 15 uses the result 25 R of the blind function evaluation protocol as a decryption key 25 to decrypt the encrypted secrets 5. In another embodiment, the client 15 derives from the result R 25 intermediary strong secrets 60 that can include the decryption key (and possibly other data).

The client 15 also authenticates 65 to a second server 10". Typical authentication measures can include using something the user 3 knows, something the user 3 has, some measured characteristic of the user 3, or some combination. The authentication 65 thus can take place in various ways, including without limitation by transmission of a PIN, a password, a biometric measurement, a token code, a time-based code (such as, from a SECURID token manufactured by RSA Security Inc.), use of an encryption key, use of a hash-chain approach, such as S/KEY, or some combination. If the authentication to the second device 10" is successful, then the second device 10" provides the client 15 access to, or a copy of, the encrypted secrets 5.

In one embodiment, after successfully authenticating to the second device 10" and decrypting the encrypted secrets 5, the client 15 verifies 55 the successful recovery of the encrypted secrets 5 to the first server 30. The verification step 55 could be implemented in various ways including using asymmetric cryptography, symmetric cryptography, or a proof of knowledge protocol. An advantage of using asymmetric cryptography is that the initialization step 33 is more straight-forward.

Successful decryption of the encrypted secrets 5 implies that the user 3 provided the client 15 with the correct first secret 35. In one embodiment, the first server 30 only allows a client 15 to engage in the blind function evaluation protocol 40 a limited number of times without demonstrating a successful verification 55 that the encrypted secrets 5 were successfully decrypted. The purpose of the verification 55 is to ensure that an attacker could not determine the correct hardened secret 25 through exhaustive searching of the possible client 15 first secret values 35. The verification 55 can be implemented in various ways.

In one embodiment, the encrypted secrets 5 include a private key 8, which the client 15 uses to sign an identifier 70. The identifier 70 can be a nonce or other data selected by the first server 30 as representing to the first server 30 the particular instantiation of the recovery process. The identifier 70 can thus serve as a challenge, to which the client 15 responds by showing knowledge of the private key 8.

One benefit of the invention is that an attacker has to compromise both the first server 30 and the second device 10" to obtain a decrypted form of the encrypted secrets 5. Without compromise of both servers, an attacker's best attack on the secrets is on-line guessing of the user's password and other authentication factors, if any. On-line guessing in this context means the attacker attempts to guess by participating in the protocol and providing guessed values to either the first server 30 or the second device 10". In general, the success of on-line guessing can be severely limited by preventing the attacker from making more than a certain number of guesses, either by halting acceptance of guesses after more than a certain number have been made, or by increasing the delay time before the system responds to an on-line guess after a certain number have been made. In general, if such guess-prevention mechanisms are in place, limiting an attacker to on-line guessing is a sufficient level of security.

For example, in a simple implementation involving a first server 30 and a device 10 (as in FIG. 2), the user has a first PIN or password and the user has a token, such as a two-factor authentication token that produces a time-based token code in response to the current time, a token code, and a second PIN. In this implementation, the first server 30 merely stores the intermediate data 22, and transmits it to the client upon receipt of the first PIN or password. Preferably, the communication takes place over an encrypted communications channel to ensure the security of the first PIN or password and the intermediate data 22. The client uses the token code to authenticate to the device 10 and accesses the encrypted secrets 5. The intermediate data 22 is used to decrypt the encrypted secrets 5.

In this simple implementation, an attacker that has not compromised either the first server 30 or the device 10 needs to perform both on-line password guessing and on-line tokencode guessing. If the device 10 is compromised (but not the first server 30), the attacker can either try off-line guessing of the decryption key of the encrypted secrets 5 (the success of which is highly improbable) or the attacker still needs to undertake on-line guessing of the first PIN or password. If the first server 30 is compromised (but not the device 10'), the attacker still has to undertake on-line token-code guessing. If both the first server 30 and the second device 10" are compromised, then the attacker has direct access to the encrypted secrets and to the intermediate data 22 and thus can immediately decrypt the encrypted secrets 35.

As another example, another embodiment makes use of the blind function evaluation protocol and a two-factor token code. An example of such an embodiment is described in more detail with reference to FIG. 5 below. In this embodiment, the user has a first PIN or password (the first secret 35), and the user has a two-factor authentication token as in the previous example. The client participates in the blind function evaluation protocol (also referred to as a password hardening protocol) with the first server. The client provides the first secret 35 as input to the blind function evaluation protocol and obtains the strong secret R 25. The client then derives one intermediary strong secret value from the strong secret R. The client uses the token to authenticate to the second device 10" to access the encrypted secrets 5. The intermediary strong secret $T_2$ is used to decrypt the encrypted secrets 5.

In this embodiment, an attacker that has not compromised either the first server 30 or the second device 10" needs to perform both on-line password guessing and on-line tokencode guessing. If the second device 10" is compromised (but not the first server 30), the attacker can either try off-line guessing of the decryption key of the encrypted secrets 5 (the success of which is highly improbable) or the attacker still needs to undertake on-line guessing of the password. If the first server 30 is compromised (but not the second device 10"), the attacker has to undertake on-line token-code guessing and on-line first secret 35 guessing, because the blinding prevents the attacker from knowing the strong secret R 25. It is only if the both the first server 30 and the second device 10" are compromised that the attacker can undertake off-line password guessing (but cannot immediately decrypt the encrypted secrets 5).

Thus, the use of the blind function evaluation protocol provides benefits even to a system that uses a two-factor authentication token, because information is hidden from the first server 30, which information the first server 30 cannot reveal even if the first server 30 is compromised. In the event that both the first server 30 and the second device 10' are compromised, the user's password still provides a degree of protection. This degree of protection can be increased by increasing the amount of time that an attacker (as well as the actual user) needs to spend to derive the intermediary strong secret value $T_2$ from the first secret 35. Increasing the amount of time can be accomplished by increasing the complexity of the derivation of the strong secret R (which in the embodiments described herein is already relatively complex) and by increasing the complexity of the derivation of the intermediary strong secret value $T_2$ from the strong secret R. If each derivation of $T_2$ from a guess of the first secret 35 is sufficiently time consuming, even off-line guessing can be made unlikely to succeed.

In still another embodiment, described in more detail below with reference to FIG. 4, the user has only a single PIN or password. The client participates in the blind function evaluation protocol with the first server and obtains the strong secret R 25. The client then derives two intermediary strong secret values $T_1$ and $T_2$ from the strong secret R. One intermediary strong secret $T_1$ is used to authenticate with the second device 10" and the other intermediary strong secret $T_2$ is used to decrypt the encrypted secrets 5.

In this embodiment, an attacker that has not compromised either the first server 30 or the second device 10" can only perform on-line password guessing. If the second device 10" is compromised (but not the first server 30), the attacker can either try off-line guessing of the decryption key of the encrypted secrets 5 (the success of which is highly improbable) or the attacker still needs to undertake on-line guessing of the password. If the first server 30 is compromised (but not the second device 10"), the attacker is still limited to on-line password guessing, because the blinding prevents the attacker from knowing the strong secret R 25. It is only if the both the first server 30 and the second device 10" are compromised that the attacker can undertake off-line password guessing. Thus, this embodiment provides security against the compromise of a single server, using only a single (possibly weak) PIN or password.

Figure 4:
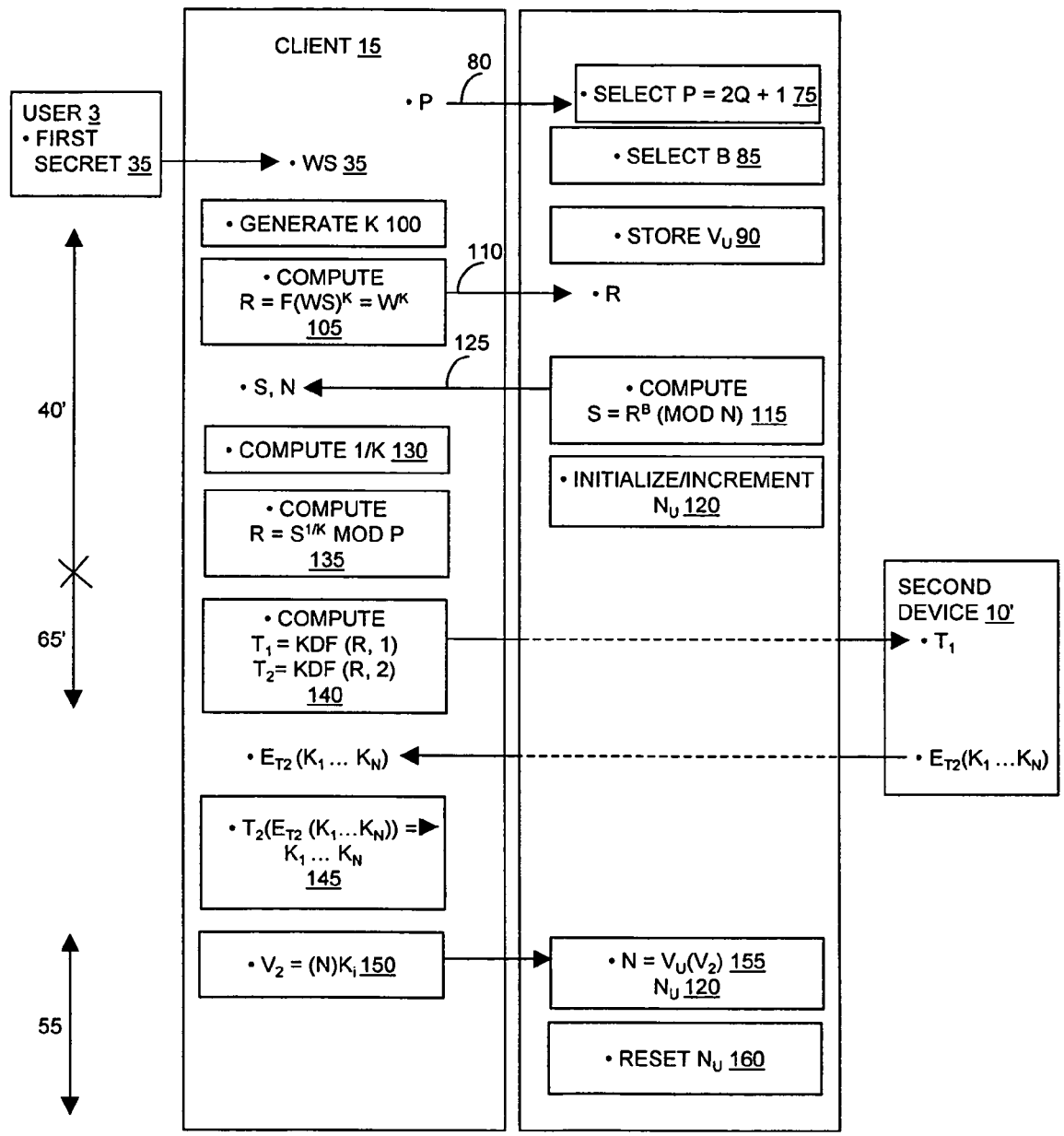
FIG. 4 is an event trace of an embodiment of a method that employs discrete logarithms in the blind function evaluation protocol.

Referring to FIG. 4, an embodiment of the invention uses discrete logarithm cryptography in the blind function evaluation protocol 40'. Prior to a user 3 attempting to access the encrypted secrets 5, initialization is performed as in the initialization 33 of FIG. 3. One step in this initialization process is that the first server 30 selects 75 a prime p such that p=2q+1 where q is a prime. The value of p is selected in this manner because it is useful to ensure that there is a large sub-group within the multiplicative group $Z_p^*$ (where $Z_p^*$ is the group of integers from 1 to (p−1) under the operation of multiplication modulo p) for straight forward cryptographic computation with minimal leakage of secret information in protocols, however other arrangements are possible. The first server 30 communicates 80p to the client 15.

The security of this discrete logarithm embodiment depends upon the parameters p and q being generated appropriately, which may be, as in the embodiment described here, that p and q are prime, and p=2q+1. In other embodiments, there may be more or less requirements on p and q, with the resulting tradeoffs in security benefits. In one embodiment, both p and q are published, or otherwise made available to the client. The client can then directly verify the properties of p and q.

The first server 30 also selects 85 a secret exponent b between 1 and q−1 for each user 3 i that can store encrypted secrets 5 $E_{T2}(K_1, \ldots, K_n)$ on the second device 10'. The first server 30 also publishes a function/that maps weaker secrets 35, such as passwords, to elements of the multiplicative group $Z_p^*$. For instance, given the first secret 35 FS, $f(FS)$ might be defined as MGF(FS) mod(p) or $MGF^2(FS)$ mod(p) where MGF is a mask-generation function. Various mask generation functions can be used. One suitable MGF is MGF1, described in PKCS #1: RSA Cryptography Specifications, Version 2.0 B. Kaliski and J. Staddon, available at http:/www.rsalabs.com/pkcs/pkcs-1/index.html. For security purposes, the mapping should be independent of other cryptographic operations performed and should map to sufficiently randomly distributed values mod p. The function $f$ might be different for different users or groups of users, so long as it is possible for the client to determine the appropriate function to use.

A final step in the initialization is that the first server 30 stores 90 a verification value $v_U$. In the current embodiment, the verification value vu is the user's 3 public key. In an alternative embodiment, the verification value $v_U$ is one of the encrypted secret 5 $K_i$ known only to the user 3 and the first server 30, or something derived from the encrypted secret 5 $K_i$.

Having initialized to the first server 30, the user 3 can then use the first server 30 to access his or her encrypted secrets 5. To initiate access to the encrypted secrets 5, the user 3 provides 95 his or her first secret 35 to the client 15. The client 15 then generates 100 a random exponent k that satisfies $1 \leq k \leq q-1$. The client 15 next computes 105 $r = f(FS)^k = w^k$ mod p and transmits 110 this value along to the first server 30. The exponentiation 105 by k serves to hide the value of $f(FS)$ from the first server 30 and from parties observing communications between the client 15 and the first server 30. In this way, even a party that compromises the first server 30 will not be able to determine the user's 3 underlying first secret 35. Depending on the form of $f(FS)$, it may not ensure that all values of r are equally likely.

For example, if $p=2q+1$ and $f(FS)=MGF(FS)^2$ mod p, where MGF(FS) is defined to map to a subset of the integers between 2 and p−2, then $f(FS)$ is an element in the multiplicative subgroup of $Z_p^*$ of order q, and all values of r are equally likely. As another example, if $p=2q+1$ and $f(FS)$ =MGF(FS), with the same definition of MGF, then $f(FS)$ is an element in the multiplicative group $Z_p^*$, but not necessarily in the subgroup of order q. The value $f(FS)$ may either have order q or order 2q. If it has order q, then all values of r are equally likely, but if it has order 2q, only about half the elements of $Z_p^*$ are possible, and information about $f(FS)$ is leaked, although it is not clear how to exploit this information. As a result, if $f(FS)$ is defined without squaring, k should range from 1 to 2q−1. A small amount of information may still be leaked (in particular, whether $f(FS)$ is in the subgroup of order q or not), but this is not significant.

In any implementation where $p=2q+1$, one bit of b may be leaked (specifically, whether it is even or odd) by an attacker who sends values not in the multiplicative group of order q, to determine whether they are mapped into the group or not when raised to the b power. This attack can be overcome by raising to the 2b power, or choosing an even value of b. In the more general situation, $f(FS)=MGF(FS)^a$ mod p, where $p=aq+1$, and $a>2$, and the greatest common divisor of a and q is 1. More bits of b may be leaked in this situation, specifically, the value b mod a. This can be overcome by raising to the a·times b power, or choosing a value of b that is divisible by a. This is described further in U.S. Pat. No. 5,933,502 to Vanstone et al. The general hardening function g(w, b) in the discrete logarithm embodiment is given by $g(w, b,) = w^b$ mod p. Upon receiving r, the first server computes 115 $s = r^b$ mod p. The term b is the first server's 30 secret input. Exponentiation by this factor transforms the first secret 35 into a recoverable hardened secret. Undoing the exponentiation is not mathematically feasible for sufficiently large valves of b due to the discrete logarithm problem. For the same reason, the term b remains unknown to the client 15. That is, even with knowledge of r and s the client 15 can not feasibly determine b.

In addition, if this is the user's 3 first attempt to access the encrypted secrets 5 or first attempt since successfully accessing the encrypted secrets 5, the first server 30 initializes 120 the access attempt variable $n_U$. If this is not the user's 3 first attempt, then the first server 30 increments 120 the access attempt variable $n_U$. The access attempt variable $n_U$ is used by the first server 30 as a mechanism to lock-out or throttle an attacker who is attempting to determine the hardened secret 25 by guessing the first secret 35. In one embodiment, if the access attempt variable $n_U$ exceeds a predetermined number, then further attempts to harden the particular user's 3 first secret 35 are prohibited until either the first secret 35 is changed or a system administrator determines that the failed attempts do not represent a security threat. In another embodiment, the first server 30 increasingly delays its communication 125 of s and N (discussed below) as the access attempt variable $n_U$ increments. This throttling mechanism makes it impractical for an attacker to determine the hardened secret 25 by searching all possible values of the first secret 35.

If the allowed number of attempts has not been exceeded, the first server 30 returns 125 s and a unique index, or nonce N, for this instantiation of the attempted recovery process. In one embodiment, the nonce N is derived from the access attempt variable $n_U$ such that the derived value is unique for each instantiation. In another embodiment, the nonce N is chosen at random.

Upon receiving s and N, the client 15 computes 130 1/k, the multiplicative inverse of k mod q. The client 15 uses this value to generate 135 the hardened secret 25 R according to $R = s^{1/k}$ mod p. This step 135 reverses the blinding factor k that was used to hide communications between the client 15 and the first server 30. In this embodiment, the client 15 uses R to compute 140 the intermediary strong secret values $T_1$ and $T_2$ according to the relationship $T_i = KDF(R, i)$ where KDF is a key derivation function. The key derivation function allows the system 300 to produce multiple intermediary strong secrets 60 from the hardened secret 25 R. The nature of the KDF is that knowledge of $T_1$ does not make it substantially easier to determine $T_2$. Two example key derivation functions are PBKDF1 and PBKDF2, described in PKCS #5 by RSA Laboratories, a part of RSA Security Inc., available at http://www.rsalabs.com/pkcs/pkcs-5/index.html.

The client 15 then authenticates 65 the user 3 to a second device 10' by transmitting 141 $T_1$ and downloads 142 the encrypted secrets 5 $T_2(K_1, \ldots, K_n)$ that have been encrypted with $T_2$. Next, the client 15 recovers 145 the secrets $K_n$ using $T_2$. The client 3 then uses $K_1$ to produce 150 verification data to verify 55 to the first server 30 that the current secret decryption attempt was successful. In the current embodiment, $K_1$ is the user's 3 private key 8 and the client 15 uses this value to sign 150 the nonce N. The first server 30 verifies the signature on the value N by applying 155 the user's 3 stored public key $v_U$. If the signature verifies, then the first server 30 is assured that the client 15 successfully decrypted the secret value $K_1$. In this case, the access attempt is considered successful and the value of the access attempt variable $n_U$ is reset 160. If the decryption was unsuccessful, the value of $n_u$ would remain unchanged to be incremented 120 by any subsequent attempts so that, as mentioned above, if an excessive number of unsuccessful attempts were made, hardening of the particular user's 3 first secret 35 would be prohibited or throttled.

To help ensure the security of the encrypted secrets 5, the client 15 can be configured to store the encrypted secrets 5 only in active memory so that they will be lost whenever the client 15 is shut down. In addition, the client 15 can be configured to purge the encrypted secrets 5 whenever a particular user 3 signs off the client 15 or after a fixed period of time.

If the user's only secret is a PIN or password, as it is in this embodiment, the authentication protocol between the client 15 and the second device 10' should not provide enough information for an eavesdropper to verify a guess of $T_1$ and $T_2$ by examining messages exchanged between the client 15 and the second device 10'. Otherwise, an attacker that compromises the first server 30 can verify guesses of the password by deriving R and $T_1$ and checking whether $T_1$ is correct. If the second device 10' is physically local to or integrated with the client 15, this protection may be inherent in the architecture. If the client 15 and the second device 10' are separated by a computer network, however, one way to achieve this is to use a secure communication protocol, such as SSL, which encrypts and integrity-protects the data.

Likewise, the hardened secret 25 R should be obtained from the password in a manner such that the client can be assured that R has been computed by the first server 30 (and not an attacker) before the client 15 uses a key derived from R to authenticate to the device. Otherwise, an attacker that compromises the device may be able to manipulate the protocol to cause the client 15 to use a different key in a way that leaks information about the user's password. For instance, by manipulating the protocol so that the intermediate value s returned is the same as the value r provided by the client, the attacker can cause the hardened secret R to equal the value $f(FS)$. The keys $T_1$ and $T_2$ would then directly depend on the password. If $T_1$ is used to authenticate to the device in a typical challenge-response protocol, the attacker will be able to verify whether guesses of the password are correct. There is a similar attack if the encrypted secrets 5 are transmitted in the clear. Again, the use of a secure communication channel, such as SSL will provide the necessary security.

Alternatively, a "proof of correctness" can be used to so the client can determine whether the correct value of b has been applied. A proof of correctness is stronger than an SSL session as it does not require the client to trust the server to perform the computation correctly, and so provides more than is necessary to meet the protocol's design goal, which is for the client to know that the server was involved. In embodiments using the RSA cryptosystem (described further with regard to FIG. 5), the "proof" is built in. The client simply checks that $R=f(FS)^e$ (mod n). A proof involves additional computations for the discrete logarithm approach described above. An illustrative example of the embodiment shown in FIG. 4 is given by a cellular telephone that contains a dedicated cryptographic chip containing encrypted secrets 5. In this example the cellular telephone is the client 15 and the cryptographic chip is the second device 10'. As cellular telephones can be lost, it is advantageous to strongly encrypt the encrypted secrets 5, such as a private key 8 used for digital signatures, on the cryptographic chip. As mentioned above, the decryption key 25 necessary to decrypt strongly encrypted secrets 5 can be difficult for users 3 to remember.

Given this, the cellular telephone can be configured to employ the embodiment shown in FIG. 4 in which a first secret 35, such as a PIN, can be used to access strongly encrypted secrets 35. According to this embodiment, a user 3 would first enter 95 a numeric PIN as a first secret 35 into the cellular telephone key pad when he or she wanted to, for example, execute a digital signature. The cellular telephone would then modify and blind 105 the PIN and transmit 110 it to a first server 35. The first server 35 would then apply 115 its secret b and transmit 125 the resulting value, as intermediate data 22, back to the cellular telephone. The cellular telephone would then unblind the intermediate data thereby generating 135 the hardened secret 25 R. Using the hardened secret 25 R, the cellular telephone would generate 140 two intermediary strong secrets $T_1$ and $T_2$. Next, the cellular telephone would transmit 141 $T_1$ to the cryptographic chip for authentication 65'. Assuming that the authentication 65' was successful, the cryptographic chip would then download 142 into the cellular telephone's active memory the encrypted secrets 5. The cellular telephone would then use $T_2$ to decrypt 145 the encrypted secrets 5. Using the private key 8, or employing one of the alternative methods discussed above, the cellular telephone would then verify 55 to the first server 30 that it had successfully accessed the encrypted secrets 5. With access to the private key 8, the cellular telephone could then use the private key 8 to form a digital signature to, for example, execute a digital transaction.

Figure 5:
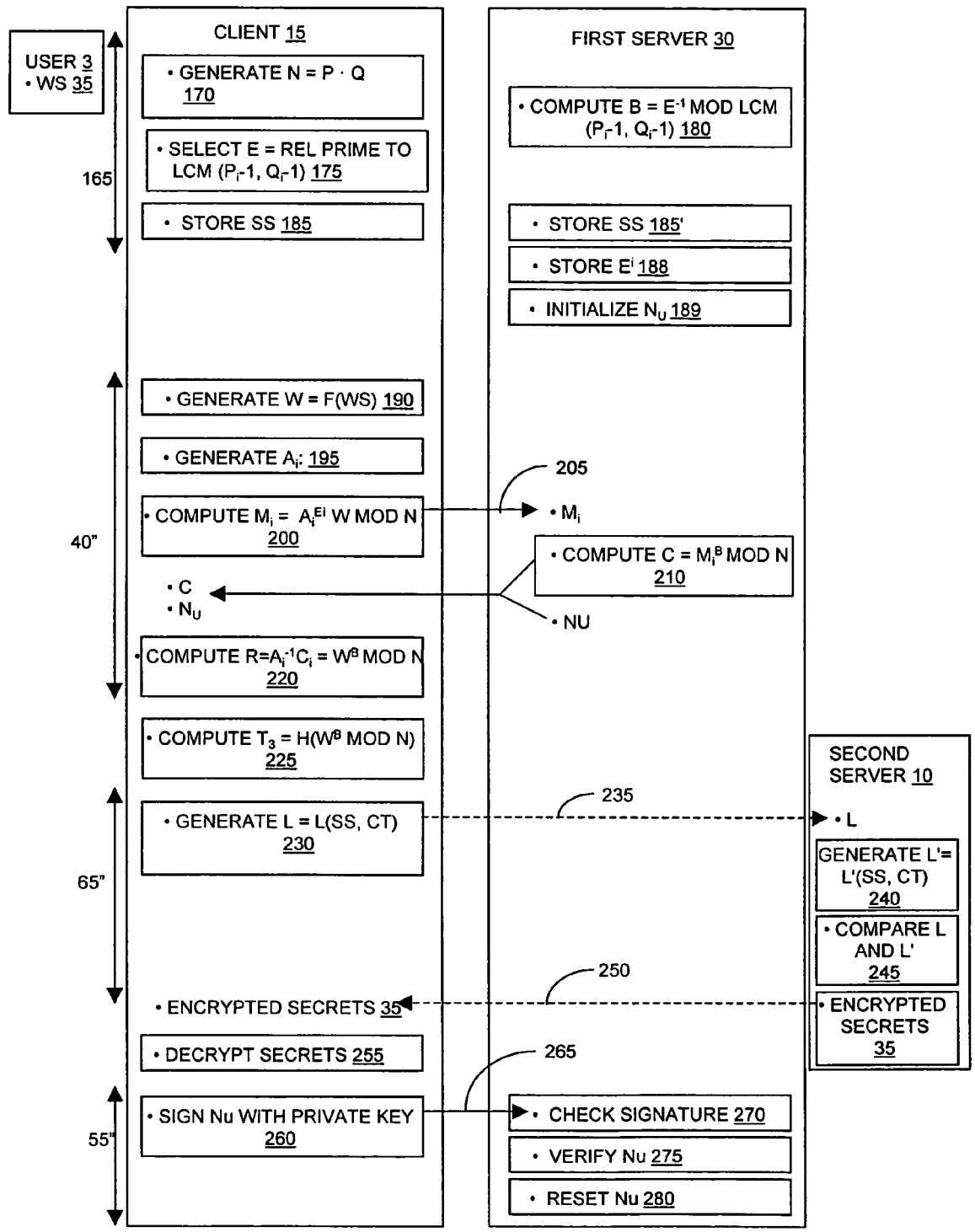
FIG. 5 is an event trace of an embodiment of a method that employs the RSA cryptosystem in the blind function evaluation protocol.

Referring to FIG. 5, in another embodiment, the blind function evaluation protocol 40" is based on the RSA cryptosystem, which is based on the problem of extracting roots modulo a composite, and which is described in R. Rivest, A. Shamir, and L. Adleman, "A Method for Obtaining Digital Signatures and Public-key Cryptosystems," Communications of the ACM, 21(2) pp. 120-126, February 1978 and "PKCS #1: RSA Cryptography Specifications," Version 2.0, by B. Kaliski and J. Staddon, available at http://www.rsalabs.com/pkcs/pkcs-1/index.html. The use of the RSA cryptosystem to perform blind signatures in the context of anonymous digital cash is described in D. Chaum, "Security Without Identification: Transaction Systems to Make Big Brother Obsolete," Communications of the ACM, 28 (1985), 1030-1044.

Also, in this embodiment, to show an example of this type of authentication, the authentication 65" operation employs a time-based token code. As before, the system includes a client 15 that receives a first secret 35 from a user 3, a first server 30, and a second device 10'.

As part of initialization, the first server 30 generates 170 a product n that is the product of two primes, $p_i$ and $q_i$ for each user 3 i. The values $p_i$ and $q_i$ are large prime numbers, for example numbers larger than 512 bits in length, and n is the RSA modulus. The first server 30 also selects 175 a value $e_i$ that is a small integer that is relatively prime to LCM($p_i-1$, $q_i-1$), where LCM stands for Least Common Multiple. The value of $e_i$ is the public exponent in the RSA cryptosystem. The public exponent $e_i$ is chosen to be relatively prime to LCM($p_i-1$, $q_i-1$) so that it is assured that a multiplicative inverse b exists. The value of b is defined by $b=e_i^{-1}$ mod LCM($p_i-1$, $q_i-1$). The RSA cryptosystem makes use of the fact that $M^{be}$ mod(n)=$M^{eb}$ mod(n)=$M^1$ mod n, where M is a message to be encrypted. That is, the exponentiation of M to $e_i$ and then to b or the exponentiation of M to b and then $e_i$ returns M to its original value mod(n).

The value b is the server secret input, which is either computed 180 by the first server or, in an alternative embodiment, stored on the first server 30 after being generated elsewhere, during initialization 33 (FIG. 3). An additional step in the initialization of the client 15 and the first server 30 is that both store 185, 185' a secret seed SS that is used as part of the authentication 65" process. A further initialization step is that the first server 30 stores 188 a copy of the public exponent $e_i$ and the modulus $n_i$ or publishes them so that they can be provided to the client, and initializes 189 the access attempt variable $n_U$.

The hardening function $R=g(w, b)$ in the RSA cryptosystem-based embodiment is defined by $g(w, b)=w^b$ mod n. The value w is generated 190 as above via a function $f$ applied to a user 3 supplied first secret 35, such as a password P. That is, $w=f(FS)$ where the function $f$ may be based on a mask generation function and FS is the first secret 35 as previously. To blind the initial communication from the client 15 to the first server 30, the client 15 generates 195 a random value $a_i$ such that $(1<a_i<n-1)$ and $\gcd(a_i, n)=1$. The value $a_i$ is relatively prime to n so that an inverse of $a_1^{ei}$ is guaranteed to exist. The client 15 then 200 computes $M_i=a_i^{e_i} w$ mod n. Here, $a_i^{e_i}$ is a random element of $Z_n^*$, regardless of $f(w)$. Provided that $f(w)$ is in $Z_n^*$, so that it does not contain a factor in common with n, the $M_i$ will be a random element of $Z_n^*$, so all values of $M_i$ are equally likely. As all values of $a_i$ are equally likely, multiplication by the value $a_i$ serves to blind the value of w mod n with respect to the first server 30 and with respect to someone observing communications between the client 15 and the first server 30. The value $M_i$ is transmitted 205 to the first server 30 by the client 15.

The next step in the blind function evaluation protocol 40" is that the first server 30 computes 210 the value $c=M_i^b$ mod n and returns 215 this value to the client 15 along with the nonce N. As described above, this operation reverses the exponentiation by $e_i$ because $e_i$ and b are the multiplicative inverses of each other. Mathematically the value of c is given by $h=\text{mod } n=a_i w^b$ mod n. If the space for b is sufficiently large, the exponentiation of $M_i$ by b serves to harden the user's 3 first secret 35 P. As mentioned above, the value of $w^b$ mod n is blinded from observers (including the first server 30) by the multiplication by the random value of $a_i$. In order to limit unauthorized attempts to harden a first secret 35, the nonce N is returned is returned by the first server 30 to the client 15 to identify this instantiation of the encrypted secrets 5 recovery attempt for verification purposes.

The final stage in the blind function evaluation protocol 40" first involves the client 15 removing the blinding associated with the random value $a_i$. The client 15 achieves this by multiplying 220 c mod n by $a_i^{-1}$ mod n. The unblinding is represented mathematically by $a_i^{-1} c = w^b$ mod n. To provide additional security to the hardened secret $R=w^b$ mod n 25", the unblinded value is next entered 225 as the input to a hash function h so that the intermediary strong secret $T_3$ 65" is given by $T_3 = h(a_i^{-1} c \text{ mod } n)$.

An advantage of the RSA cryptosystem-based blind function evaluation protocol 40" is that it only involves one short exponentiation, one multiplication, and one modular inversion per user 3. The modulus may be the same for each user 3 i provided that the exponents $e_i$ are different, so that protocol runs are associated with a particular user 3 i and throttling of other account-specific countermeasures can be enabled. If the exponent $e_i$ varies for each user 3 i, the set of possible exponents should be pairwise relatively prime to $\text{LCM}(p-1, q-1)$.

The security of the RSA cryptosystem-based blind function evaluation protocol 40" depends on the modulus n and the exponent e forming a valid RSA public exponent such that n is a product of two large primes, and e is relatively prime to $\Phi(n)$. If n is not a product of two large primes, it may be possible for an attacker to determine the value R from $f(w)$, and if e is not relatively prime to $\Phi(n)$, then information about $f(w)$ may be leaked from the client information $a^e f(w)$.

In one embodiment, the server provides the n and e values to the client in a certificate, where the certificate associates the n and e values with the particular user. The certificate authority can assure that the n and e values are valid before issuing the certificate. To do this the certificate authority may, for example, use the methods and apparatus described in co-pending U.S. Ser. No. 09/188,963, entitled "Methods and Apparatus for Verifying the Cryptographic Security of a Selected Private and Public Key Pair Without Knowing the Private Key," by Liskov et al., incorporated herein by reference.

It should be noted that in the embodiment of FIG. 5, proper selection of e may be more critical than selection of n. If a compromised first server selects n such that it does not have prime factors, that will help an attacker who compromises the device. But a improper selection of e will make it possible for someone else (who has not compromised the device 10'), to attack the system.

As mentioned above, the authentication step 65 can be implemented in various ways. In the embodiment shown in FIG. 5, the authentication 65" shows the details of using a time-based token code. Under this method, the client 15 generates 230 a dynamic password L as a function of a secret seed SS and the current time CT (and optionally a user PIN PP) and sends 235 the dynamic password L to the second device 10'. To authenticate 65" the client 15, the second device 10' regenerates 240 a version L' of the dynamic password L from its copy of the secret seed SS, the current time CT (and the user PIN PP, if appropriate). The second device 10' then compares 245 the dynamic password L it received from the client to the one L' that it generated. If there is not an exact match, the second device 10' can be configured to recalculate the regenerated dynamic password L' utilizing times nearby to its current time CT to synchronize its clock with the client's 15 clock. In an alternative embodiment, the second device 10' does not directly verify the dynamic password L but instead employs a third server to generate and verify the client's 15 dynamic password L.

In the current embodiment, the generation of the dynamic password L by the user is implemented as a physical token, such as a RSA SECURID token. In an additional alternative embodiment, the physical token is combined with a PIN to provide additional security through a two-factor authentication process. The use of the token is just one way that authentication could be implemented.

In another embodiment, biometric information is used for the authentication step 65". The use of biometric derived information for authentication 65" could be similar to the use of biometric derived information for the first secret 35. The initial biometric information, such as a fingerprint or iris scan, is here converted into-authentication data. In one embodiment as in the first secret 35 case, the error correction codes are stored on error correction servers connected to the network 20 and can be signed by an independent server to ensure integrity. Before providing the authentication data, the client 15 obtains the error correcting information and verifies its integrity. The client 15 then combines the information with the initial biometric information to generate the authentication data that is used to authenticate 65" to the second device 10'. In other embodiments, the error correction codes are stored in other locations including on the client 15, on the first server 30, or the second device 10'.

In an additional embodiment also employing biometric-derived information for authentication 65" no error correction codes are utilized. In this embodiment, the authentication 65" process tolerates a range of biometric values. According to this embodiment, the client 15 transmits the biometric derived information to the second device 10', and if this information falls within the range that the second device 10' is configured to accept, then the second device 10' will consider that the client 15 has successfully been authenticated 65".

Once the client 15 has been authenticated 65" by the second device 10', the second device 10' provides 250 to the client 15 the encrypted secrets 5. To decrypt the encrypted secrets 5 the client 15 uses the intermediary strong secret $T_3$. Once the encrypted secrets 5 are decrypted 255, the client 15 verifies 55 this to the first server 30 as before. That is, the client 15 signs 260 the nonce N with the user's 3 private key 8 and transmits 265 this valve to the first server 30. The client 15 has access to the user's private key 8 because, as before, the user's private key 8 was one of the encrypted secrets 5. The first server 30 then checks 270 the signature using the user's 3 public key $Pub_u$ and verifies 275 that the nonce N representing this instantiation of the access attempt is correct. Assuming the nonce N is verified, the value of the access attempt variable $n_u$ is reset 280 for further access attempts.

Figure 6:
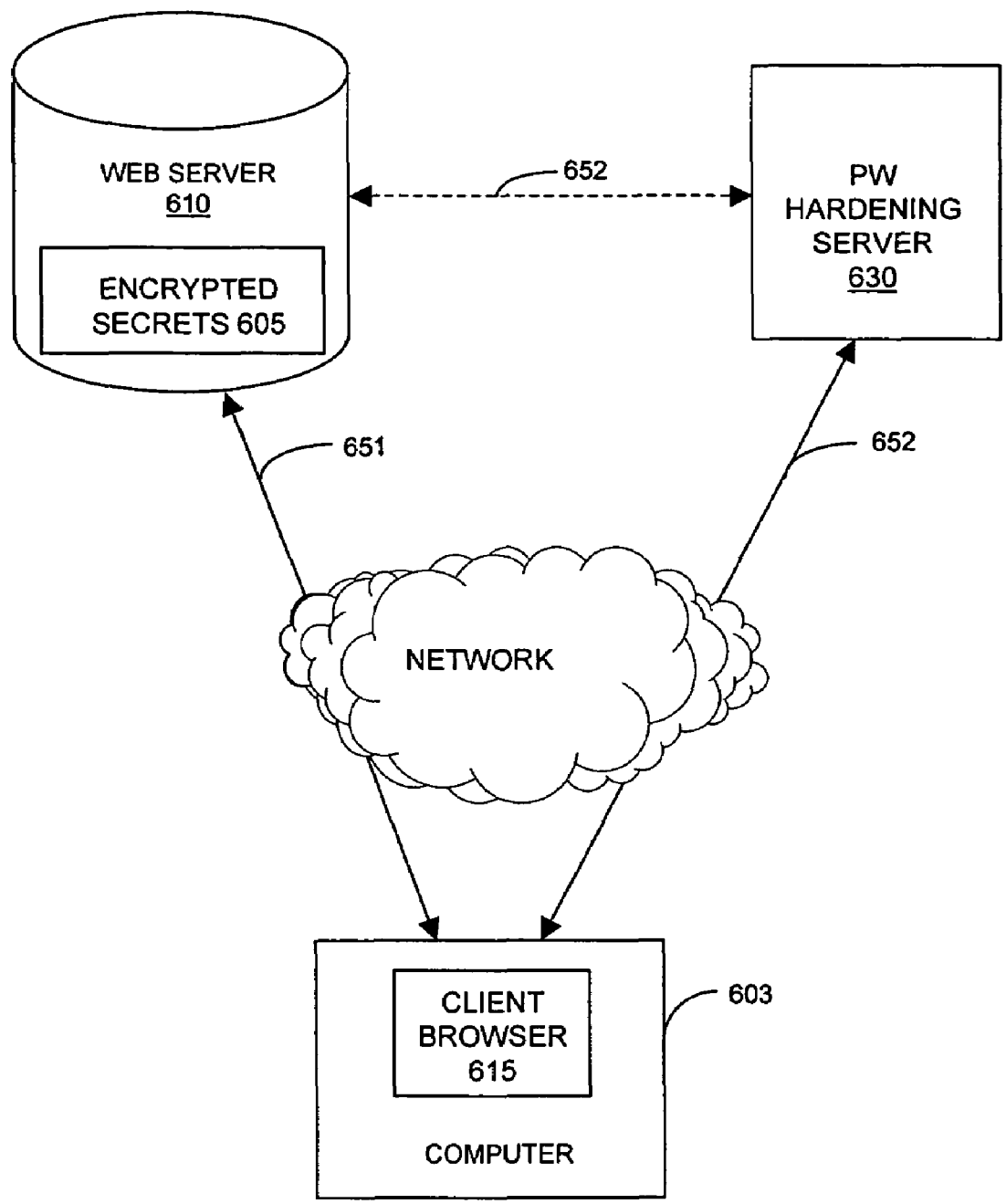
FIG. 6 is a block diagram of an embodiment used to authenticate a user.

Referring to FIG. 6, in another embodiment, a user 603 uses commercially available web browser software running on a personal computer 615 (the client in this embodiment), to access a web server 610 over a computer network such as the Internet. In this interaction with the web server 610, the user 603 provides certain personal information, such as the user's name and address, and possibly other information, such as personal preferences, demographic information, financial information (credit card or bank account numbers), and so on, to the web server 610.

This personal information is useful for the interaction of the user 603 with the web server 610 using the client 615, and the user 603 would typically prefer not to provide the same information to the web server 610 each time the user interacts with the web server 610. The personal information could be stored on the client 615, but this may not be practical, for example because the user would like to access the web server 610 from more than one location, or for example because the client 615 is not used by the user 603 exclusively.

It therefore is useful to store the personal information on the web server 610, but in a manner that makes it difficult for an attacker to access the personal information. For performance reasons, web servers are frequently placed on an open network outside of firewalls and other security measures, and so they are vulnerable to attack. The user's personal information can be stored as encrypted secrets 605. As described above, if a user-provided password (or other weak secret) is used as a key to encrypt the personal information, the password is likely to be a weak key, and so it will likely afford less than optimal protection to the encrypted secrets. In one embodiment, the encrypted secrets are stored such that they can be decrypted with a hardened password. In various embodiments, a user's password is used as the input to a blind function evaluation protocol in which either the client or the web server participates with a hardening server 630. The result of the blind function evaluation protocol is used as or to derive a decryption key for the encrypted secrets.

In one embodiment, the user communicates 651 with the web server 610, and the web server 610 directs the browser to communicate 652 with the hardening server 630. If the web browser does not have the appropriate code to engage in the blind function evaluation protocol, either the web server 610 or the hardening server 630 can provide the browser with the necessary code, for example in the form of a Java applet, or in the form of a browser plug-in, or in the form of executable code for the computer.

The client 615 and the hardening server 630 engage in a blind function evaluation protocol, with the result that the client derives a hardened password. The hardened password is communicated to the web server, which then decrypts the user's personal information, and so can make the personal information available to the user as part of the user's interaction with the web server 610. When the user has completed his interaction with the web server 610 (e.g. logs off), the web server deletes the unencrypted secrets, keeping only the encrypted secrets in its data store. If the data store of the web server 610 is compromised, the attacker has access only to the encrypted secrets, and cannot directly access to the user's personal information.

In one embodiment, the blind function evaluation protocol takes as input a web server 610 identifier, in addition to the client information and the first server secret. The web server identifier might be, for example, some portion of the URL or network address of the web server, or the web server identifier could be another identifier assigned to one or more web servers. The web server 610 identifier is used in the blind function evaluation protocol, for example as an input to the blind function, and/or as an input to the key derivation function that derives the decryption key from the result of the blind function. By including the web server identifier 610 as an input to the blind function evaluation protocol, the user need only have one password, yet the client would generate different decryption keys for different web servers.

In one such embodiment, the web server 610 communicates the verification information to the hardening server 630. When the web server 610 decrypts the encrypted secrets, it uses some information in the encrypted secrets to prove to the hardening server that successful decryption has occurred. In this embodiment, the client communicates to the web server 610, along with the decryption key, the nonce or other verification information provided by the hardening server.

In another embodiment, the client 615 provides the client information (derived from the user's password and/or other secret data) directly to the web server 610, and the web server 610 engages 652 in the blind function evaluation protocol with the hardening server. The web server 610 then derives the decryption key from the hardened password (which may be the hardened password) to decrypt the encrypted secrets. In this way, the client 615 has to do less work, but the web server is able to store data that is only vulnerable to compromise when the user is communicating with the web server 610.

Figure 7:
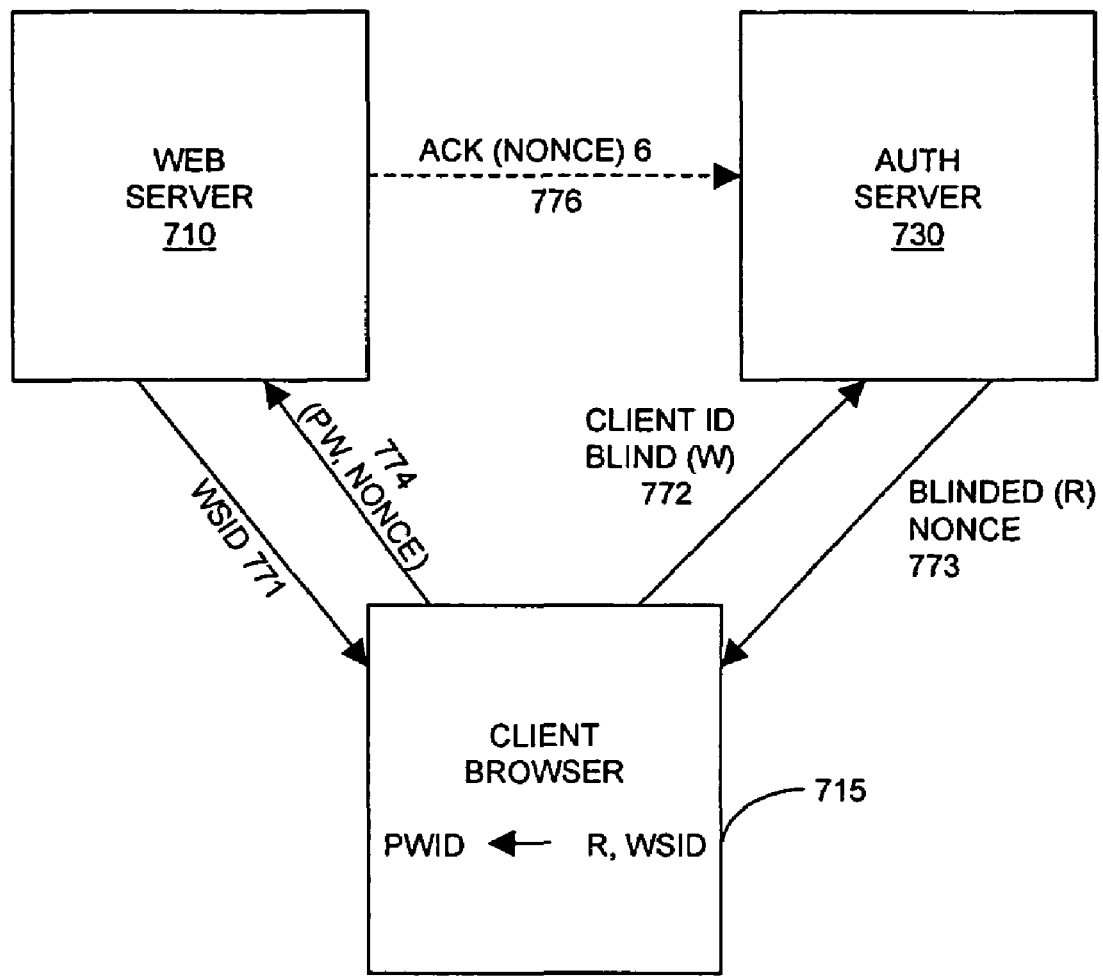
FIG. 7 is a block diagram showing the data flow in one embodiment of a system used to authenticate a user.

Referring to FIG. 7, in a variation of the embodiment of FIG. 6, the client 715 uses the password hardening server 730 to generate a hardened password that is used to authenticate the client 715 to the web server 710. The client 715 receives a web server identifier WSID 771. The web server identifier might be, for example, some portion of the URL or network address of the web server, or the web server identifier could be another identifier assigned to one or more web servers. Instead of receiving the WSID from the web server, the client could derive the WSID from such other information, store a list of WSID's locally, or request the WSID from a server on the network (such as the authentication server 730).

The client provides 772 the client information (which is derived from the user's secret) to the authentication server 730 as part of the client's participation in a blind function evaluation protocol. The client may also provide the web server identifier WSID, and the client may also provide a user identifier to the authentication server 730 as part of the blind function evaluation protocol. The WSID can be used in the blind function evaluation protocol, for example as an additional input to the blind function, to select a server secret to use in the blind function evaluation protocol. This may be in addition to or instead of the use of the WSID as an input to the key derivation function that derives the decryption key from the result R of the blind function. The user identifier may be used to selected the appropriate server secret, or for other purposes.

The authentication server 730 returns the blinded result R to the client 715, along with a nonce or other session identifier 772. The client generates a hardened password for use in authenticating to the web site based on the result R of the blind function evaluation protocol and possibly the other information (i.e. user identifier, web site identifier). By including the web server identifier WSID as an input to the key derivation function (and/or as an input to the blind function evaluation protocol), the user need only have one password, yet the client can generate different passwords for authentication to different web servers.

The client communicates 774 the hardened password and the nonce to the web server 710. For the verification, the web server 710 sends 775 a message to the authentication server 730, indicating whether or not the authentication attempt associated with the nonce was successful. If the authentication was successful, the hardening server resets the attempt counter, if it was not successful, the account variable is increased. Preferably, the message is communicated such that the web server 710 cannot be impersonated. For example, the communication can include the digital signature of the web server on the nonce.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method comprising:
    implementing a multi-party secure computation protocol between a client which has a client secret and a server which has a server secret to compute a third secret from the client secret and the server secret, wherein the protocol is implemented so that the client obtains the third secret and cannot feasibly determine the server secret, and the server cannot feasibly determine the client secret and cannot feasibly determine the third secret;
    authenticating the client by a device, the device storing an encrypted secret and configured not to provide the encrypted secret without authentication and the device being distinct from the server; and
    after authenticating, providing to the client by the device the encrypted secret, wherein the encrypted secret is capable of being decrypted using a decryption key derived from the third secret and wherein the multi-party secure computation protocol implemented between the client and the server is the only multi-party computation protocol that is implemented in generating the third secret and the decryption key derived from the third secret;
    wherein implementing the multi-party secure computation protocol involves:
    at the client, using the client secret to compute client information to harden the client secret and then sending the client information to the server;
    at the server, using the client information and the server secret to compute intermediate data and sending the intermediate data to the client; and
    at the client, deriving the third secret from the intermediate data.

2. The method of claim 1 wherein the third secret is derived from the intermediate data by use of one of a key derivation function and a hash function.

3. The method of claim 1 wherein the client secret comprises at least one of a PIN, a password, and biometric information.

4. The method of claim 3 wherein the intermediate data is derived from at least the client secret and the server secret by use of a blind function evaluation protocol.

5. The method of claim 4 wherein the security of the blind function evaluation protocol is based on the problem of extracting roots modulo a composite.

6. The method of claim 4 wherein the security of the blind function evaluation protocol uses discrete logarithms.

7. The method of claim 1 wherein authenticating comprises authenticating the client based on a time-dependent code.

8. The method of claim 1 wherein authenticating comprises authenticating the client based on at least one of a PIN, a password, and biometric information.

9. The method of claim 1 wherein authenticating comprises authenticating the client based on a secret other than the client secret.

10. The method of claim 1 wherein authenticating comprises using an authentication secret derived from the third secret.

11. The method of claim 1 wherein the device comprises at least one of a file server, a directory server, a key server, a PDA, a mobile telephone, a smart card, and a desktop computer.

12. The method of claim 11 wherein the device comprises at least one secure data store, the device requiring authentication before allowing the client access to the data store.

13. The method of claim 1 wherein the encrypted secret comprises an encrypted private key of a public/private key pair used for asymmetric cryptography.

14. The method of claim 13 wherein the encrypted secret comprises an encrypted signature key used for creating a digital signature.

15. The method of claim 14 wherein authenticating comprises authenticating the client based on a secret other than the client secret, so that the user provides different information to access the device and access the signature key.

16. The method of claim 1 wherein the encrypted secret comprises an encrypted secret key used for symmetric cryptography.

17. The method of claim 1 wherein the encrypted secret comprises at least one unit of encrypted digital currency.

18. The method of claim 1 further comprising verifying that the client has not exceeded a predetermined number of unsuccessful attempts to obtain the intermediate data.

19. The method of claim 18 wherein verifying further comprises:
    transmitting a challenge code to the client; and
    receiving the result of a cryptographic operation using the challenge code as an input and using a cryptographic key derived from the encrypted secret.

20. The method of claim 1, further comprising
    deriving the decryption key from the third secret; and
    decrypting the encrypted secret using the decryption key.

21. A method for authenticating to a network server, the method comprising:
    implementing a multi-party secure computation protocol between a client which has a client secret and a server which has a server secret to compute a third secret from the client secret and the server secret, wherein the protocol is implemented so that the client cannot feasibly determine the server secret and the server cannot feasibly determine the client secret and cannot feasibly determine the third secret;
    at the client deriving a password from the third secret;
    authenticating to the network server using the derived password, wherein the multi-party secure computation protocol implemented between the client and the server is the only multi-party computation protocol that is implemented in generating the third secret and the password derived from the third secret;

wherein implementing the multi-party secure computation protocol involves:

at the client, using the client secret to compute client information to harden the client secret and then sending the client information to the server;

at the server, using the client information and the server secret to compute intermediate data and sending the intermediate data to the client; and at the client, deriving the third secret from the intermediate data.

22. The method of claim 21 further comprising transmitting to the first server by the network server verification that the user has authenticated successfully.

23. The method of claim 21 wherein the network server is a web server.

24. The method of claim 21 wherein deriving comprises deriving a server password using a key derivation function.

25. The method of claim 1, wherein the multi-party secure computation protocol is a blind function evaluation protocol.

26. The method of claim 25, wherein the blind function evaluation protocol is based on discrete-logarithm cryptography.

27. The method of claim 26, wherein the blind function evaluation protocol is based on an RSA algorithm.

28. A method comprising:

implementing a multi-party secure computation protocol between a client which has a client secret and a server which has a server secret to compute a third secret from the client secret and the server secret, wherein the protocol is implemented so that the client cannot feasibly determine the server secret and the server cannot feasibly determine the client secret and cannot feasibly determine the third secret;

authenticating the client by a device, the device storing an encrypted secret and configured not to provide the encrypted secret without authentication; and after authenticating, providing to the client by the device the encrypted secret, wherein the encrypted secret is capable of being decrypted using a decryption key derived from the third secret and wherein no additional multi-party secure computation protocol involving any entity other than the server is required to enable the client to generate the third secret and the key derived from the third secret;

wherein implementing the multi-party secure computation protocol involves:

at the client, using the client secret to compute client information to harden the client secret and then sending the client information to the server;

at the server, using the client information and the server secret to compute intermediate data and sending the intermediate data to the client; and at the client, deriving the third secret from the intermediate data.

29. The method of claim 21, wherein the password is derived from the third secret and a server identifier.

30. The method of claim 1, wherein the multi-party secure computation protocol comprises the client and the server providing their respective secrets as input to respective protocol operations that jointly calculate the third secret as a function of the client and server secrets.

31. The method of claim 21, wherein the multi-party secure computation protocol comprises the client and the server providing their respective secrets as input to respective protocol operations that jointly calculate the third secret as a function of the client and server secrets.

32. The method of claim 28, wherein the multi-party secure computation protocol comprises the client and the server providing their respective secrets as input to respective protocol operations that jointly calculate the third secret as a function of the client and server secrets.

33. The method of claim 1, wherein implementing the multi-party secure computation protocol between the client which has the client secret and the server which has the server secret to compute the third secret from the client secret and the server secret comprises implementing the multi-party secure computation protocol between the client which has the client secret and a single server which has the server secret to compute the third secret from the client secret and the server secret.

34. The method of claim 21, wherein implementing the multi-party secure computation protocol between the client which has the client secret and the server which has the server secret to compute the third secret from the client secret and the server secret comprises implementing the multi-party secure computation protocol between the client which has the client secret and a single server which has the server secret to compute the third secret from the client secret and the server secret.

35. The method of claim 28, wherein implementing the multi-party secure computation protocol between the client which has the client secret and the server which has the server secret to compute the third secret from the client secret and the server secret comprises implementing the multi-party secure computation protocol between the client which has the client secret and a single server which has the server secret to compute a third secret from the client secret and the server secret.

* * * * *